(12) United States Patent
Brun et al.

(10) Patent No.: US 7,822,597 B2
(45) Date of Patent: Oct. 26, 2010

(54) BI-DIMENSIONAL REWRITING RULES FOR NATURAL LANGUAGE PROCESSING

(75) Inventors: Caroline Brun, Grenoble (FR);
Caroline Hagège, Grenoble (FR);
Claude Roux, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1306 days.

(21) Appl. No.: 11/018,892

(22) Filed: Dec. 21, 2004

(65) Prior Publication Data
US 2006/0136196 A1 Jun. 22, 2006

(51) Int. Cl.
*G06F 17/27* (2006.01)
(52) U.S. Cl. .............................. 704/9; 704/1; 715/255; 715/257; 707/736
(58) Field of Classification Search ................. 704/1, 704/9; 715/255, 257; 707/2–6, 736
See application file for complete search history.

(56) References Cited

U.S. PATENT DOCUMENTS

| | | | |
|---|---|---|---|
| 5,410,475 A * | 4/1995 | Lu et al. ......................... | 704/1 |
| 5,642,522 A | 6/1997 | Zaenen et al. | |
| 5,799,269 A * | 8/1998 | Schabes et al. ................. | 704/9 |
| 5,864,789 A * | 1/1999 | Lieberman et al. ............. | 704/9 |
| 6,393,389 B1 | 5/2002 | Chanod et al. | |
| 6,405,162 B1 | 6/2002 | Segond et al. | |
| 6,598,015 B1 | 7/2003 | Peterson et al. | |
| 2003/0074187 A1 | 4/2003 | Ait-Mokhtar et al. | |
| 2005/0065776 A1 * | 3/2005 | Coden et al. ................... | 704/10 |

OTHER PUBLICATIONS

Piskorski et al., Piskorski, An Intelligent Text Extraction and Navigation System, Nov. 5, 1999, Proceedings of the RIAO-2000, pp. 1-24.*
Koskenniemi, A General Computational Model For Worde-Form Recognition and Production, 1984, Association for Computational Linguistics, p. 178-181.*
Aimelet, E., Lux, V., Jean, C., Segond, F., "WSD evaluation and the looking-glass", Conference TALN 1999, Cargese, Jul. 12-17, 1999.
Ait-Mokhtar, S., Chanod, J-P., "Incremental Finite-State Parsing", Proceedings of Applied Natural Language Processing 1997, Washington, DC, Apr. 1997.
Ait-Mokhtar, S., Chanod, J-P., "Subject and Object Dependency Extraction Using Finite-State Transducers", Proceedings of the Workshop on Automatic Information Extraction and the Building of Lexical Semantic Resources, ACL, Madrid, Spain, 1997, p. 71-77.
Ait-Mokhtar, A., Chanod, J-P., Roux, C., "A Multi-Input Dependency Parser", Seventh International Workshop on Parsing Technologies, Oct. 17-19, 2001, Beijing.

(Continued)

*Primary Examiner*—David R Hudspeth
*Assistant Examiner*—Lamont M Spooner
(74) *Attorney, Agent, or Firm*—Fay Sharpe LLP

(57) ABSTRACT

A linguistic rewriting rule for use in linguistic processing of an ordered sequence of linguistic tokens includes a token pattern recognition rule that matches the ordered sequence of linguistic tokens with a syntactical pattern. The token pattern recognition rule incorporates a character pattern recognition rule to match characters contained in an ambiguous portion of the ordered sequence of linguistic tokens with a character pattern defining a corresponding portion of the syntactical pattern.

19 Claims, 4 Drawing Sheets

OTHER PUBLICATIONS

Ait-Mokhtar, S., Chanod, J-P., Roux, C., "Robustness Beyond Shallowness: Incremental Dependency Parsing", Special Issue of *Natural Language Engineering*, vol. 8, Nos. 2/3, 2002 Cambridge University Press, UK, p. 121-144.

Ballim, A., Coray G, A. Linden, A., and Vanoirbeek, C. The Use or Automatic Alignment on Structured Multilingual Documents. In J. Andre et H. Brown (editor), Electronic Publishing, Artistic Imaging, and Digital Typography: proceedings/Seventh International Conference on Electronic Publishing, EP'98 Document Manipulation and Typography, Saint-Malo, France, Apr. 1998. Springer-Verlag, p. 464-475.

Bauer, D., Segond, F., Zaenen, A., "LOCOLEX, the Translation Rolls off Your Tongue", Proceedings of ACH-ALLC '95, Santa Barbara, CA, Jul. 11-15, 1995, p. 6-9.

Beesley, K.R., Karttunen, L., "Finite State Morphology", CSLI Studies in Computational Linguistics, CSLI Publications, Stanford, CA 2003.

Bille, P., "Tree Edit Distance, Alignment Distance and Inclusion", Technical Report TR-2003-23, IT University of Copenhagen, ISSN 1600-6100, Mar. 2003, ISBN 87-7949-032-8, p. 1-22.

Breidt, E., Segond, F., Valetto, G., "Formal Description of Multi-Word Lexemes with the Finite-State Formalism IDAREX", Proceedings of COLING, Copenhagen, Aug. 5-9, 1995, p. 1036-1040.

Breidt, E., Segond, F., Valetto, G., "Local grammars for the description of multi-word lexemes and their automatic recognition in texts", COMPLEX96, Budapest, Sep. 1996.

Bresnan, J., Kaplan, R.M., "Lexical-functional grammar: A formal system for grammatical representation", The MIT Press Series on Cognitive Theory and Mental Repr., Cambridge, MA, 1982, p. 173-281.

Brill, E., "A simple rule-based part of speech tagger", Third Annual Conference on Applied Natural Language Processing, ACL. 1992, p. 152-155.

Brun, C., "A client/server architecture for word sense disambiguation", Proceedings of the 18$^{th}$ International Conference on Computational Linguistics (COLING 2000), Saarbrucken, Allemagne, Jul. 31-Aug. 4, 2000, p. 132-138.

Brun, C., Segond, F., "Semantic Encoding of Electronic Documents", *International Journal of Corpus Linguistic*, vol. 6, No. 1, 2001.

Casillas, A., Abaitua, J., Martinez, R.; "DTD-Driven Bilingual Document Generation", International Natural Language Generation Conference, Mitzpe Ramon, Israel, 2000, p. 32-38.

Casillas, A., Martinez, R., "Bitext segmentation and alignment for specialized document composition", *Traitement automatique de la langue* (TAL), vol. 42—No. Feb. 2001, p. 441-458.

Chomsky, N., "Syntactic Structures", Haag, Mouton, 1957.

Dini, L., DiTomaso, V., Segond, F., "Error Driven Word Sense Disambiguation", Proceedings of COLING/ACL98, Montreal, Canada, 1998, p. 320-324.

Dini, L., DiTomaso, V., Segond, F., "GINGER II: An example-driven word sense disambiguator", *Computers and the Humanities*, Special Issue on Senseval, vol. 34, No. 1-2, Apr. 2000, Kluwer Academic Publishers, The Netherlands, p. 121-126.

Fellbaum, C., "Wordnet: An Electronic Lexical Database", The MIT Press, (Language, speech, and communication series), Cambridge, MA, 1998.

Gale, W.A., Church, K.W., "A Program for aligning sentences in bilingual corpora." 29$^{th}$ Annual Meeting of the Association for Computational Linguistics (ACL), Berkeley, CA, Jun. 1991, p. 177-184.

Gandrabur, S., Foster, G., "Confidence estimation for translation prediction", Seventh Conference on Natural Language Learning, Edmonton, Canada, Jun. 2003.

Ide, N., Veronis, J., "Word Sense Disambiguation: The state of the art", Computational Linguistics, vol. 24, No. 1, 1988.

Kupiec, J., "Robust part-of-speech tagging using a hidden Markov model", *Computer Speech and Language*, vol. 6, 1992, p. 225-242.

Navarro, G., "A guided tour to approximate string matching", ACM Computing Surveys, vol. 33 No. 1:31-88, 2001.

Navarro, G., Yates, R., Sutinen, E., Tarhio, J., "Indexing Methods for approximate string matching", IEEE Data Engineering Bulletin, vol. 24 No. 4: 19-27, 2001.

Pereira, F. C. N., Warren, D.H.D., "Definite clause grammars for language analysis—a survey of the formalism and a comparison with augmented transition networks", *Artificial Intelligence*, vol. 13, 1980, p. 231-278.

Poibeau, T., "Deconstructing Harry—une evaluation des systemes de reperage d-entites nommees", Revue de Societe d'electronique, Thales, 2001.

Romary, L., Bonhomme, P., "Parallel alignment of structured documents", Text Speech and Language Technology, Parallel Text Processing, 2000 Kluwer Academic Publishers, The Netherlands, p. 201-217.

Segond, F., Breidt, E., (Automatic (machine) Understanding of multiple word expressions in French and German) Comprehension automatique des expressions a mots multiples en francais et en allemand, Quatriemes Journees Scientifiques de Lyon, lexicomatique et Dictionairiques, Sep. 1995.

Vergne, J., Pages, P., "Synergy of syntax and morphology in automatic parsing of French language with a minimum of data, Feasibility study of the method", Proceedings of COLING '86, Bonn, Aug. 25-29, 1986, p. 269-271.

U.S. Appl. No. 11/018,758, filed Dec. 21, 2004, Brun.

U.S. Appl. No. 11/018,891, filed Dec. 21, 2004, Lux-Pogodalla, et al.

Brun et al., "Intertwining deep syntactic processing and named entity detection," Advances in Natural Language Processing, 4$^{th}$ International Conference, ESTAL 2004, pp. 195-206, 2004.

Hagege et al., "Advances in Natural Language Processing, Third International Conference, Portal 2002," pp. 197-207, 2002.

Narayanaswamy et al., "A Biological Named Entity Recognizer," Proceedings of the Pacific Symposium on Biocomputing, pp. 427-438, 2003.

Ait-Mokhtar et al., "Robustness Beyond Shallowness: Incremental Deep Parsing," Natural Language Engineering, Cambridge University Press, vol. 8, No. 2/3, pp. 121-144, 2002.

Abney, "Parial Parsing Via Finite-State Cascades," European School in Logic, Language and Information, Workshop on Robust Parsing, pp. 8-15, 1996.

\* cited by examiner

BI-DIMENSIONAL REWRITING RULES FOR NATURAL LANGUAGE PROCESSING

BACKGROUND

The following relates to the linguistic arts. It finds particular application in conjunction with automated natural language processing for use in diverse applications such as electronic language translators, grammar checkers for word processors, document content analyzers, and so forth, and will be described with particular reference thereto. However, it is to be appreciated that the following is also amenable to other like applications.

Natural language processing is typically performed in three distinct processing layers: a lexical processing layer, a syntactical processing layer, and a semantic processing layer. At the lexical stage, the linguistic input is broken into base constituent parts, typically including words and punctuation. Each word, punctuation mark, or other element is typically referred to as a token. At the lexical layer, an attempt is made to associate each word or token with lexical information contained in a lexicon. The lexicon includes morpho-syntactic information, semantic information, and associated parts of speech. Such token association at the lexical stage is referred to as morphological analysis. The lexical layer generally operates on tokens individually, without taking into account the surrounding context, that is, the surrounding tokens. Accordingly, there is often substantial ambiguity remaining after the lexical processing. For example, the token "fly" in the English language could represent a noun indicative of an insect, or it could represent a verb indicative of aerial movement. Moreover, it could be part of collocation such as "fly wheel" indicative of a mechanical device, or "fly by" indicative of an event-involving an aircraft flying overhead.

At the syntactical layer, the tokens are processed with consideration given to contextual information. Thus, for example collocations are identified by recognizing the paired tokens (such as "fly" followed by "wheel"), and this additional contextual information is employed to narrow the word morpho-syntactic analysis and part of speech. The syntactical processing is sometimes broken down into a disambiguation level that takes into account the word definitions, and a context-free grammar level that takes into account syntactical categories (such as looking at sequences of parts of speech or higher level constituents) without otherwise considering word meaning. Such a grammar is sometimes referred to as an augmented context-free grammar. The grammar is usually described by rewriting rules. Each rewriting rule associates a higher level constituent with an ordered sequence of lower level constituents.

The rewriting rules can generally be employed in a "top-down" analysis or a "bottom-up" analysis, or in some combination thereof. In a top-down approach, the overall form of the ordered sequence of tokens making up the linguistic input is analyzed to break the sequence down into successively lower level constituents. For example, starting with a sentence (S), a rewriting rule S→NP VP is used to identify a noun part (NP) and a verb part (VP) based on the overall form of the sentence. The NP and VP are high level constituents that are in turn broken down into lower level constituents such as parts of speech.

In a bottom-up approach, individual tokens are grouped to identify successively higher level constituents. For example, the token "the" tagged as an article (ART) followed by the token "dog" tagged as a noun (N) is grouped using a rewriting rule NP→ART N to identify "the dog" as a noun part (NP) constituent. The noun part may then in turn be grouped with a verb part (VP) according to rewriting rule S→NP VP to identify a sentence (S) constituent.

Some syntactical processors employ recursive analysis. Consider the sentence: "I have answered the inquiry." which contains a past participle "answered". The lexical analysis identifies a token "have" and the token "answered". Because the lexical analysis does not consider context, the token "have" is ambiguous, as it could be for example a verb or an auxiliary verb. The token "answered" is also ambiguous, and may be either an adjective or a past participle. It is assigned an appropriately ambiguous category such as "ADJORPAP". At a first pass through the syntactical level, the ordered combination of "have" followed by a token of category "ADJOR-PAP" is recognized as a past participle form, and so "have" is categorized as an auxiliary verb and "answered" is categorized as a past participle. On a second pass through the syntactical level, a context-free re-writing rule recognizes the ordered combination of the auxiliary verb "have" followed by a past participle as a present perfect tense verbal constituent. Such recursive syntactical processing reduces the computational efficiency and speed of the syntactical layer.

Another problem arises with the use of proper names. For example, consider the proper name "Bankunited Bancorp". It would be desirable to recognize this as the proper name of a bank; however, at the lexical level the tokens "Bankunited" and "Bancorp" are unlikely to be included in the lexicon unless the named bank is a large national or international bank. If the lexicon does not contain these tokens, then the lexical level will be unable to assign morpho-syntactic information, semantic information, or parts of speech to the tokens "Bankunited" and "Bancorp". The subsequently performed syntactical level will also be unable to assign meaning to these tokens, except that possibly their status as noun parts of speech may be guessed based on the surrounding context. Similar problems arise in other higher level constituent classes whose members are not readily exhaustively cataloged in the lexicon, such as chemical names, personal names, and so forth.

The following copending, commonly assigned applications: Bililngual Authorizing Assistant for the "Tip of the Tounge" Problem (Xerox ID 20040609-US-NP, Ser. No. 11/018,758 filed Dec. 21, 2004); and Retrieval Method For Translation Memories Containing Highly Structured Documents (Xerox ID 20031674-US-NP, Ser. No. 11/018,891 filed Dec. 21, 2004) are herein incorporated by reference.

BRIEF DESCRIPTION

In accordance with one aspect, a storage medium is disclosed storing instructions which when executed by a digital processor implement a rewriting rule for use in linguistic processing of an ordered sequence of linguistic tokens. The rewriting rule includes a character pattern recognition rule, and a token pattern recognition rule matching the ordered sequence of linguistic tokens with a syntactical pattern. The token pattern recognition rule incorporates the character pattern recognition rule to match characters contained in an ambiguous portion of the ordered sequence of linguistic tokens with a character pattern defining a corresponding portion of the syntactical pattern.

In accordance with another aspect, a linguistic rewriting rule is disclosed for use in linguistic processing of an ordered sequence of linguistic tokens. The rewriting rule includes a character pattern recognition rule, and a token pattern recognition rule matching the ordered sequence of linguistic tokens with a syntactical pattern. The token pattern recognition rule incorporates the character pattern recognition rule to match characters contained in an ambiguous portion of the ordered sequence of linguistic tokens with a character pattern defining a corresponding portion of the syntactical pattern.

In accordance with another aspect, a linguistic processing method is provided for processing an ordered sequence of linguistic tokens. An attempt is made to match the ordered sequence of linguistic tokens with a syntactical pattern. At least a portion of the attempted matching is performed by attempting matching of characters contained in an ambiguous portion of the ordered sequence of linguistic tokens with a character pattern. At least one of: (i) the ordered sequence of linguistic tokens, (ii) an ordered sub-sequence of the ordered sequence of linguistic tokens, and (iii) a selected token of the ordered sequence of linguistic tokens, is categorized responsive to a successful matching.

In accordance with yet another aspect, a parser is disclosed for parsing a linguistic input. A tokenizing module is in operative communication with a lexicon. The tokenizing module divides the linguistic input into an ordered sequence of linguistic tokens. A character pattern recognition component is provided for attempting matching of an ordered sequence of characters with a character pattern. A token pattern recognition component is provided for attempting matching of the ordered sequence of linguistic tokens with a syntactical pattern. The token pattern recognition component invokes the character pattern recognition component to attempt matching of an ambiguous portion of the ordered sequence of linguistic tokens with an indeterminate portion of the syntactical pattern. A category associator is provided for associating a constituent category with at least one of: (i) the ordered sequence of linguistic tokens, (ii) an ordered sub-sequence of the ordered sequence of linguistic tokens, and (iii) a selected token of the ordered sequence of linguistic tokens. The associating is performed responsive to a successful matching performed by the token pattern recognition component.

DETAILED DESCRIPTION

Figure 1:
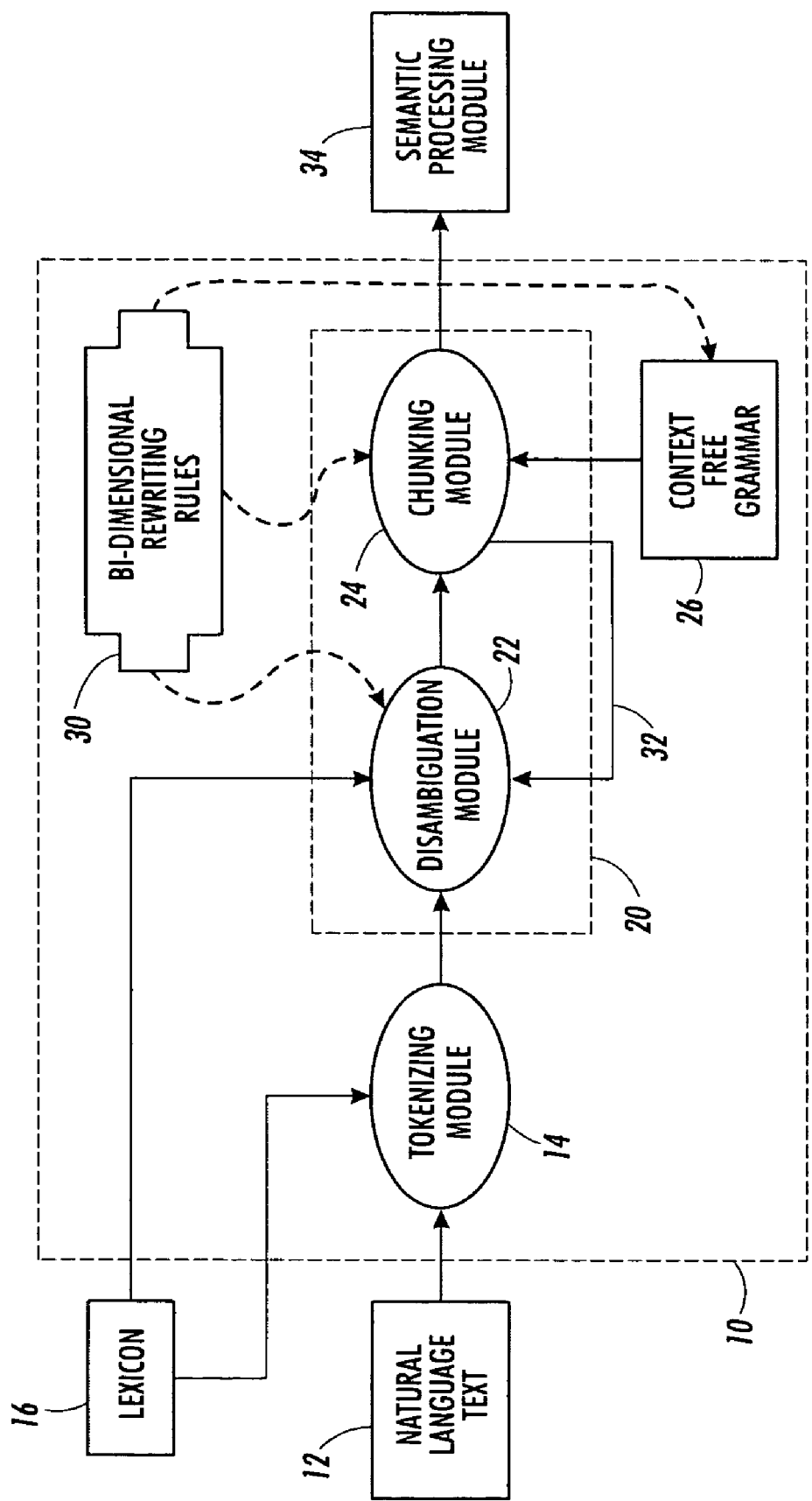
FIG. 1 diagrammatically shows a block diagram of an example natural language processing system.

With reference to FIG. 1, a natural language processing system includes a parser 10 that receives a natural language text 12, such as a paragraph, sentence, a portion of a sentence, or a multiple-word text fragment written in French, English, or another natural language. The parser 10 includes a tokenizing module 14 that breaks the natural language text 12 down into an ordered sequence of tokens. For example, in a suitable approach each word bounded by spaces and/or punctuation is defined as a single token, and each punctuation mark is defined as a single token. The tokenizing module 14 also performs lexical or morphological processing. The tokenizing module 14 attempts to assign morpho-syntactic information, semantic information, and a part of speech to each token without considering surrounding context of the token, that is, without considering adjacent tokens. To do so, it references a lexicon 16.

The lexicon 16 is a database of words of the French, English, or other natural language undergoing processing. The lexicon 16 associates morpho-syntactic information, semantic information, and parts of speech with the stored words of the natural language. Thus, for example, a token "gorilla" is identified in the lexicon 16 with morpho-syntactic information such as "masculine", "singular", or so forth, and with semantic information such as "animal", and is also categorized as a noun constituent. In some embodiments, the tokenizing module 14 uses automatons to divide the input text 12 into tokens and to compare and identify tokens with entries in the lexicon 16.

However, because the lexical processing performed by the tokenizing module 14 does not consider context, some tokens may be ambiguous. For example, the token "document" can be a noun or a verb, depending upon how it is used in an English sentence. This can be addressed in the lexical processing by assigning to the token "document" both noun and verb as two candidate parts of speech. In addition, some tokens may not be included in the lexicon 16. For example, the lexicon 16 cannot include a comprehensive and exhaustive list of the proper name of every person, place, business, or other named entity.

After the lexical processing performed by the tokenizing module 14, the ordered sequence of tokens undergoes syntactical analysis performed by a syntactic processor 20. While the lexical analysis considered each token in isolation, the syntactical analysis considers ordered combinations of tokens. Such syntactical analysis may unambiguously determine the parts of speech of some tokens which were ambiguous or unidentified at the lexical level. Additionally, syntactical analysis can identify higher level constituents which are made up of more than one word or token. Thus, for example, the ordered sequence of tokens "have answered" can be unambiguously identified both as to parts of speech of the individual tokens "have" and "answered", and as a higher level verbal constituent "have answered".

In some embodiments, the syntactical analysis employs a context free grammar, which takes into account grammatical categorizations such as parts of speech and higher level categorizations such as multi-word proper names, noun parts, and so forth, but which does not take into account the meaning of words given by the word definitions. However, a purely context free grammar may miss collocations, which are multiple word constructs that use tokens in non-standard ways. For example, the term "fly wheel" uses the constituent token "fly" in a non-standard way.

Accordingly, in the illustrated embodiment an augmented context-free grammar is used. A disambiguation module 22 processes collocations based on information from the lexicon 16. Thus, if the lexicon identifies the collocation "fly wheel", the disambiguation module 22 suitably categorizes the token "wheel" as a noun (N), and the token "fly" as an adjective (ADJ). It will be appreciated that a purely context-free grammar is unlikely to be able to properly categorize "fly" because "fly" is not ordinarily an adjective.

The context-free component of the augmented context free grammar is implemented by a chunking module 24 that applies a context free grammar 26 defined by suitable rewriting rules. Each rewriting rule of the context free grammar 26 defines a token pattern recognition rule matching an ordered sequence of linguistic tokens with a syntactical pattern, and thus associates a higher level constituent with an ordered sequence of lower level constituents defined by the ordered sequence of linguistic tokens. For example, the rewriting rule S→NP VP associates the higher level sentence (S) constituent with lower level noun part (NP) and verb part (VP) constituents each of which is made up of an ordered sequence of one or more linguistic tokens. The rewriting rule NP→ADJ N associates a higher level noun part (NP) with a token tagged as an adjective (ADJ) followed by a token tagged as a noun (N).

These are examples only; typical context free grammars include many such rewriting rules that collectively encompass many syntactical patterns. Both the disambiguation module 22 and the rewriting rules of the context free grammar 26 operate at the token constituent level or higher.

The chunking module 24 also implements bidimensional rewriting rules 30 that address certain syntactical constructs which the augmented context free grammar is unable to efficiently process. Each of the bidimensional rewriting rules 30 defines a token pattern recognition rule matching an ordered sequence of linguistic tokens with a syntactical pattern. Unlike the rewriting rules of the context free grammar 26 which operate at the token constituent level or higher, each bidimensional rewriting rule incorporates at least one character pattern recognition rule that matches characters contained in an ambiguous portion of the ordered sequence of linguistic tokens with a character pattern defining a corresponding portion of the syntactical pattern. Hence, the bidimensional rewriting rules 30 are bidimensional in that the they describe linguistic expressions according to both lexical patterns at the character level and syntactical patterns at the token constituent level or higher.

The bidimensional rewriting rules 30 address certain syntactical patterns that require syntactical considerations and hence are not addressable at the lexical level, but which are not readily described at the token or higher constituent level alone. For example, business entities often have proper names that include a word root suggestive of the type of business. The word root is insufficient to tag the token at the lexical level, but when combined with syntactical information can be unambiguously identified. A similar situation exists in chemical names which are commonly multiple word terms constructed from word roots related to chemical elements. The word roots are sometimes identifiable at the character level, but the number of combinations are too diverse to be cataloged in the lexicon 16. Other situations where bidimensional rewriting rules 30 are advantageous are set forth in the examples provided herein.

The syntactic processor 20 is an illustrative example. In some embodiments, the syntactic processing may be recursive, as indicated by the dotted processing backflow arrow 32 in FIG. 1. In some embodiments, the disambiguation module 22 is omitted such that the syntactic processor implements a purely context free grammar. In some embodiments, the disambiguation module 22 and the chunking processor 24 are combined as a single unitary syntactic processor that implements both context free rewriting rules and selected context-based rewriting rules using morpho-syntactic and semantic information obtained from the lexicon 16.

The output of the parser 10 can be used in various ways, depending upon the intended application of the natural language processing system. For example, in a grammar checker for use in conjunction with a word processor, the output of the parser 10 may be used directly—if all tokens are successfully tagged with unambiguous parts of speech, then the corresponding natural language text 12 is deemed grammatically correct; whereas, if some tokens are unable to be unambiguously tagged, these ambiguities are reported as possible grammatical problems, for example by underlining the ambiguous words in the displayed word processing text. In document content analyzers, language translators, and other applications in which the meaning of the text is relevant, the output of the parser 10 may undergo further processing. Such further semantic processing is generally indicated in FIG. 1 by a semantic processing module 34, which may perform document content analysis, language translation, or so forth.

Having described the illustrated example parser 10 which incorporates bidimensional rewriting rules 30, some examples of bidimensional rewriting rules are described to provide further illustration.

Certain entity type assignments are suitably addressed by a properly constructed bidimensional rewriting rule. It is difficult to have exhaustive list of proper names of businesses or other organizations in the lexicon 16. For example, a short list of possible names of financial institutions is: BankAtlantic Bancorp; Bankunited Financial; BankEngine Technologies; and Bankshare Benchmark. This list is clearly not exhaustive. The tokens "BankAtlantic", "Bankunited", "BankEngine", "Bankshares" are unlikely to be included in the lexicon 16. Each of these tokens carries strong information about the fact that they are part of the proper name of a financial institution, due to the capitalized word root "Bank" in each token. However, by itself, this word root is insufficient for the tokenizer 14 to identify the isolated token as part of a proper name. This root in combination with surrounding syntactical information provided by the capitalization of the following token, provides enough information to assert relatively assuredly that the ordered token sequences: "BankAtlantic Bancorp"; "Bankunited Financial"; "BankEngine Technologies"; and "Bankshare Benchmark" are proper names of financial institutions. However, the context free grammar 26 operates at the token constituent level or higher, and thus is unable to account for the "Bank . . . " word root in a context free grammar rule. A bidimensional rewriting rule, however, can account for both the character-based word root aspect "Bank . . . " and the syntactical aspect of following a token having this word root with a capitalized noun.

A suitable bidimensional rewriting rule that identifies all these token sequences as financial institutions is suitably written algebraically as:

$$\text{noun[organization:+]} \rightarrow \text{noun[lemma:Bank?+], noun[lemma:[A-Z]?*]} \quad (1),$$

where the bidimensional rewriting rule (1) is interpreted as follows: "an element of category noun bearing the feature organization is rewritten as the concatenation of an element of category noun whose lemma matches with 'Bank' followed by any sequence of characters and of an element of category noun starting with a capital letter." Using the bidimensional rewriting rule (1), all previous financial institution proper names, as well as many similarly named financial institutions, will be assigned the feature organization, without requiring additional lexical coding for words that do not belong to the lexicon 16.

Figure 2A:
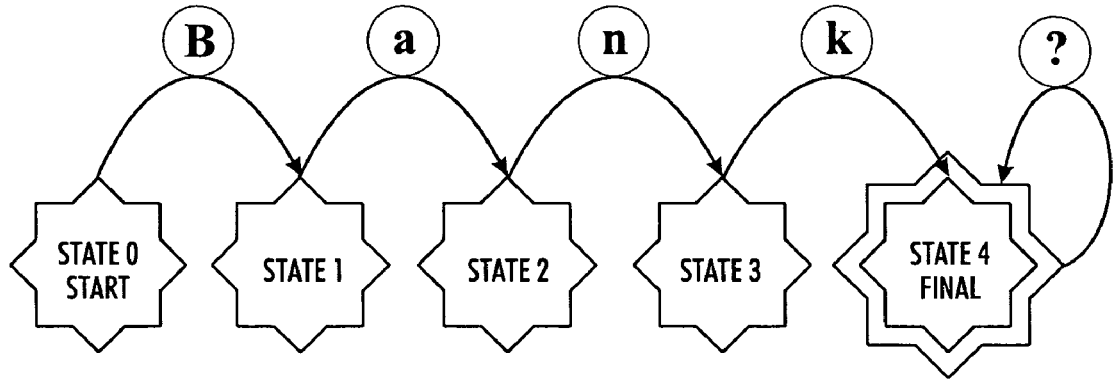
FIGS. 2A, 2B, 3A, 3B, and 4 diagrammatically show various character-based automatons suitable for implementing character pattern recognition rules incorporated into example bidimensional rewriting rules described herein.
Figure 2B:
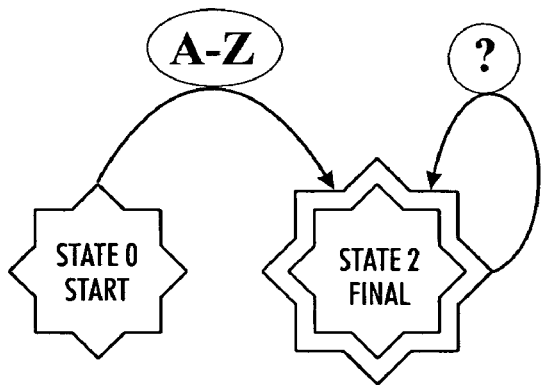

With reference to FIGS. 2A and 2B, each of the two character pattern recognition rule components of the bidimensional rewriting rule (1) include a lemma. Each lemma addresses an ambiguous portion of the syntactical pattern, and is suitably implemented by an automaton such as a transducer. FIG. 2A diagrammatically shows an automaton that suitably implements "lemma:Bank?+". FIG. 2B diagrammatically shows an automaton that suitably implements "lemma:[A-Z]?*". The automaton of FIG. 2A operates on the characters of the first token of the ordered sequence of tokens from left-to-right, while the automaton of FIG. 2B operates on the characters of the second token of the ordered sequence of tokens, also from left-to-right.

Another example application of bidimensional rewriting rules deals with the recognition of multiword terminology in domain specific corpora. For example, in domains such as chemistry and medicine, chemical element names are often built on similar lexico-syntactic patterns. Consider, for example, the following non-exhaustive list of acid names: alpha-collatolic acid, alectoronic acid, barbatic acid, caperatic acid, constictic acid, consalazinic acid, 4-o-demethylbarbatic acid, civaricatic acid, echinocarpic acid, evemic acid, fumarprotocetraric acid, glomelliferic acid, glomellic acid, gyrophoric acid, lobaric acid, lecanoric acid, norobtusatic acid, norstictic acid, nrotocetraric acid, nerlatolic acid, secalonic acid, stenosporic acid, stictic acid, salazinic acid, and usnic acid. There are many other similarly named acids, in which the name includes a word ending in "-ic" followed by "acid". A comprehensive list of such acids would be difficult to encode in the lexicon 16. However, all acid names which include a word ending in "-ic" followed by "acid" are suitably covered by the bidimensional rewriting rule:

Noun[acidName=+]→?[lemma:[a-z\-]+ic], noun [lemma:acid]     (2).

The bidimensional rewriting rule (2) suitably categorizes all of the aforementioned acid names without coding anything in the lexicon 16.

Figure 3A:
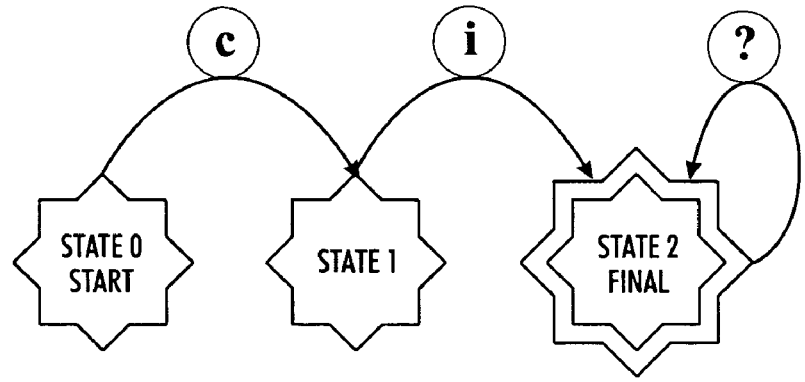
Figure 3B:
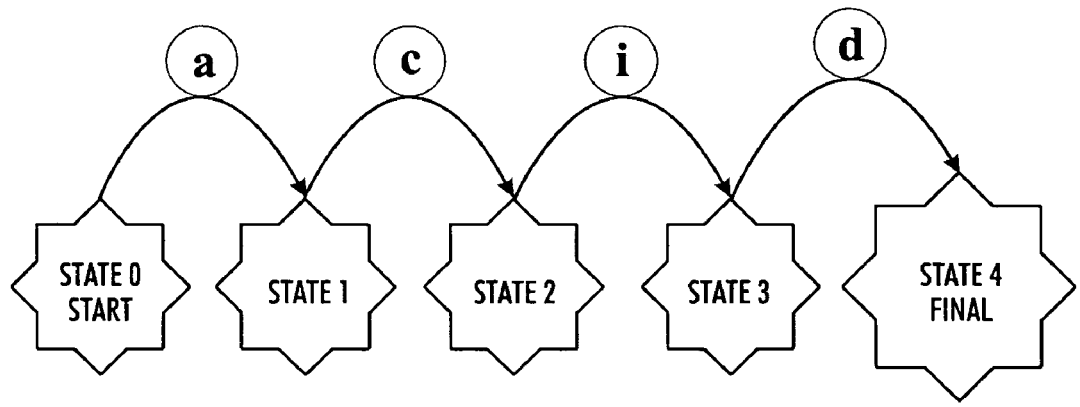

With reference to FIGS. 3A and 3B, the character pattern recognition rules in bidimensional rewriting rule (2) include two lemmas. Each lemma addresses an ambiguous portion of the syntactical pattern, and is suitably implemented by an automaton such as a transducer. FIG. 3A diagrammatically shows an automaton that suitably implements "lemma:[a-z\-]+ic". FIG. 2B diagrammatically shows an automaton that suitably implements "lemma:acid". The automaton of FIG. 2A operates on the characters of the first token from right-to-left, while the automaton of FIG. 2B operates on the characters of the second token from left-to-right. Since the second lemma is a fixed-length four-letter word, an equivalent automaton operating from right-to-left (running from State 4 to State 0 of FIG. 2B) would also be suitable.

Bidimensional rewriting rules can also be advantageous in identifying parts of speech based on syntactical information. For example, consider a syntactical pattern in which an ambiguous unknown word ending with "-ed" is preceded by a form of the verb "have". The syntactic processor 20 can address this syntactical pattern to identify the word ending in "-ed" as a past participle by taking advantage of the context, and can simultaneously construct a complex verbal form with a form of the "have" auxiliary verb followed by the word ending in "-ed" using the following bidimensional rewriting rule:

Verb_Chain[perfect=+]→Verb[lemme:have],? [guess:+,lemma:?+ed,cat=pastparticiple]     (3), where "lemme:have" identifies various forms of the auxiliary verb "have". Using bidimensional rewriting rule (3), three linguistic processing tasks are simultaneously accomplished: (i) the word ending in "-ed" is identified as a past participle; (ii) the word ending in "-ed" is categorized as "pastparticiple"; and (iii) a higher level constituent is built from concatenation of lower level constituents.

As described previously in the Background section, the functionality of bidimensional rewriting rule (3) can be achieved using syntactical processing employing an augmented context free grammar without using a bidimensional rewriting rule. However, the equivalent processing performed without using a bidimensional rewriting rule requires two recursive passes through the syntactical level, whereas the bidimensional rewriting rule (3) accomplishes both disambiguation and higher level constituent construction simultaneously in a single pass of the syntactical level.

Figure 4:
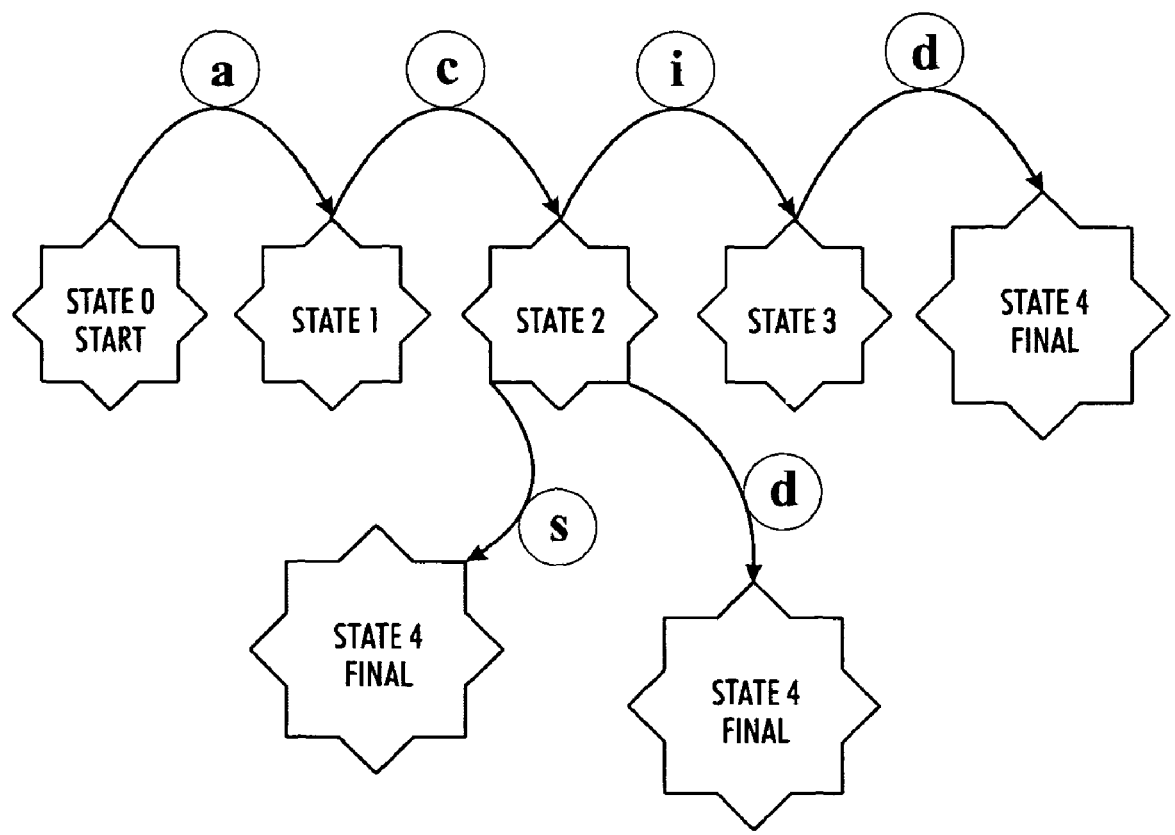

With reference to FIG. 4, the character pattern recognition rule "lemme:have" is suitably implemented by an automaton.

The automaton diagrammatically illustrated in FIG. 4 operates on the characters of the first token from left-to-right and identifies any one of the "have", "had", and "has" forms of the auxiliary verb. The "lemma:?+ed" operation is suitably implemented by the automaton of FIG. 3A operating on the characters of the second token from right-to-left, with the arc labeled "c" replaced by an arc labeled "d", and the arc labeled "i" replaced by an arc labeled "e".

As yet another example, bidimensional rewriting rules can be used to achieve a syntactic construction that is controlled by low-level characteristics of constituents building the higher level phrase. For example, a natural language processor may be used to analyze in a text all sentences containing in their subject the lemma "printer" (where the surface form can be in singular or in plural). The following bidimensional rule constructs the sentence structure and simultaneously verifies that the lemma "printer" is present in the noun part (NP) preceding a verb part (VP) in the active form:

S→NP[lemma:?*printer?*], VP[active_form:+]     (4)

The bidimensional rewriting rule (4) works both at the character level and at the phrase level to check the characteristic of the string building the NP using a regular expression. The "lemma:?*printer?*" operation is applied to the NP as follows: the characters of ordered sequence of tokens making up the NP are concatenated, and the lemma is applied to this concatenated string to identify the sub-string "printer" anywhere in the concatenated NP string. In a similar way, a surface form for a higher-level constituent can be implemented by matching the exact string found in the text that is under the node associated to this higher-level constituent.

The foregoing example bidimensional rewriting rules (1)-(4) are illustrations. While the example bidimensional rewriting rules perform entity type assignment, multi-word terms recognition, contextual guessing, and simultaneous filtering and syntactic analysis tasks, it will be appreciated that many other linguistic processing tasks can be enabled or made more efficient through the use of bidimensional rewriting rules.

The parsing described herein employing bidimensional rewriting rules can be implemented using substantially any suitable natural language processing platform. Typically, a storage medium stores instructions which when executed by a digital processor implement one or more bidimensional rewriting rules for use in linguistic processing. The digital processor may be, for example, a desktop computer, a laptop computer, a network server computer, a remote computer accessed via the Internet, a microprocessor of a cellular telephone, a microprocessor of a personal data assistant (PDA), a microprocessor of a hand held electronic language translator, or a mainframe computer. The storage medium may be, for example, a magnetic disk or an optical disk. In some embodiments, the instructions are downloaded from the Internet or another network, in which case the storage medium can be viewed as the volatile random access memory (RAM) or another storage medium that temporarily stores the instructions. The bidimensional rewriting rules can be used in top-down or bottom-up parsing pipelines, or in parsers employing some combination of top-down and bottom-up parsing.

In some embodiments, the Xerox Incremental Parser (XIP) has been adapted to perform parsing using bidimensional rewriting rules where appropriate. The XIP platform employs successive tokenization/morphological analysis, disambiguation, and chunking layers, and implements a bottom-up deterministic parsing pipeline without recursion using a single data structure to represent the linguistic information throughout the processing. Additional background concerning the XIP parser is disclosed in the following publications which are incorporated by reference: Salah Aït-Mokhtar & Jean-Pierre Chanod, Incremental finite-state parsing, in Proceedings of Applied Natural Language Processing 1997 (Washington, D.C., April 1997) and Ait-Mokhtar et al., U.S. Published Application No. 2003/0074187, Ser. No. 09/972,867, filed Oct. 10, 2001.

The bidimensional rule mechanism is implemented to provide the parser with access to in-depth information such as lemmas or surface forms: regular expressions matching surface forms or lemmas of the input string can be applied simultaneously with the construction of higher-level constituents, and therefore constrain the application of the syntactic rules. The mechanism includes the application of regular expressions on preterminal categories (like nouns, verbs, etc) and also on non-terminal categories (like noun parts (NP), verb parts (VP), etc.). In one suitable approach for applying a lemma or surface form to a non-terminal category, the processed string associated with the non-terminal constituent is the concatenation of all substrings associated with its sub-constituents. Other approaches can be used, such as applying the lemma to each token included in the non-terminal category, and disjunctively combining the results with logical "OR" operations.

In one approach for adapting the XIP to include bidimensional rewriting rules, the parser compiles each bidimensional rewriting rule as a designated automaton where a state is a combination of a category name and a complex feature structure. The regular expressions on lemmas and surface forms are also compiled into character-based automata to implement character pattern recognition rule components of the bidimensional rewriting rule. Feature validity checking of the XIP is suitably adapted to apply the character-based automata on the surface form or on the lemma of a given lexical or syntactic node. The application of the character-based automata is deterministic and applies according to the shortest match. This example adaptation of the XIP allows declaration of an arbitrary number of features. The surface form and the lemma take strings as input at running time, when lexical nodes are created out of the input. When a bidimensional rewriting rule includes one of these character pattern recognition features, the parser recognizes it at compilation time and translates the test into a character-based automaton, such as one of the example automatons illustrated in FIGS. 2A, 2B, 3A, 3B, and 4. The translation into an automaton of each of these tests allows the system to handle complex regular expressions in an efficient way. The right-hand side of a bidimensional rewriting rule can be implemented as an automaton bearing on syntactic categories, while a character pattern recognition component of the bidimensional rewriting rule is implemented as an automaton bearing on a string. The implementation of regular expressions is an example approach for implementing these expressions; however, other implementations can be employed. Moreover, while embodiments employing the XIP engine are described by way of example, it is to be appreciated that substantially any linguistic parser can readily incorporate bidimensional rewriting rules such as those described herein using suitable automata or other computational implementations.

The example embodiments have been described. Obviously, modifications and alterations will occur to others upon reading and understanding the preceding detailed description. It is intended that the disclosed embodiments be construed as including all such modifications and alterations insofar as they come within the scope of the appended claims or the equivalents thereof.

The invention of claimed is:

1. A storage medium storing instructions, which when executed by an associated digital processor, implement one or more bi-dimensional rewriting rules for use in linguistic processing of an ordered sequence of linguistic tokens, each bi-dimensional rewriting rule being implemented as an automaton in which a state is a combination of a category name and a complex feature structure and including a token pattern recognition rule matching the ordered sequence of linguistic tokens with a syntactical pattern implemented as an automaton bearing on syntactic categories, said one or more bi-dimensional rewriting rule integrating said token pattern recognition rule with at least one character pattern recognition rule that, matches characters contained in an ambiguous portion of the ordered sequence of linguistic tokens with a character pattern defining a corresponding portion of the syntactical pattern, wherein said bi-dimensional rules describe linguistic expressions according to both lexical patterns at the character level and syntactical patterns at the token level or higher.

2. The storage medium as set forth in claim 1, wherein the character pattern recognition rule includes a lemma.

3. The storage medium as set forth in claim 1, wherein the character pattern recognition rule includes a surface form.

4. The storage medium as set forth in claim 1, wherein the ambiguous portion of the ordered sequence of linguistic tokens includes a plurality of tokens defining a higher-level constituent, and the character pattern recognition rule includes one of a lemma and a surface form applied to the higher-level constituent.

5. The storage medium as set forth in claim 1, wherein the syntactical pattern includes an ordered sequence of tokens each having a selected part of speech.

6. The storage medium as set forth in claim 1, wherein the token pattern recognition rule is one of (i) a context-free grammar rule and (ii) an augmented context-free grammar rule.

7. The storage medium as set forth in claim 1, wherein the rewriting rule associates the ordered sequence of linguistic tokens matching the syntactical pattern with a named entity category.

8. The storage medium as set forth in claim 7, wherein the syntactical pattern includes a token that: (i) is categorized as a noun and (ii) starts with a capital letter.

9. The storage medium as set forth in claim 1, wherein the rewriting rule associates the ordered sequence of linguistic tokens matching the syntactical pattern with a predetermined higher-level constituent category.

10. The storage medium as set forth in claim 1, wherein the ambiguous portion includes a single token that is not tagged with a part of speech, each of the other tokens of the ordered sequence of linguistic tokens being tagged with a part of speech, and the rewriting rule associates the untagged token with a part of speech based on the matching.

11. The storage medium as set forth in claim 1, wherein the ordered sequence of linguistic tokens is selected from a group consisting of: (i) a sentence, (ii) a portion of a sentence, and (iii) a multiple-word text fragment.

12. A linguistic processing method for processing an ordered sequence of linguistic tokens, the linguistic processing method comprising:

a processor, via an automaton in which a state is a combination of a category name and a category feature structure, that implements one or more bi-directional rewriting rules, which attempt to match the ordered sequence of linguistic tokens with a syntactical pattern, wherein at least a portion of the attempted matching is performed by attempting matching of characters contained in an ambiguous portion of the ordered sequence of linguistic tokens with a character pattern by performing an automaton operation, bearing on syntactic categories, that determines whether a token of the ambiguous portion matches the character pattern, and categorizing (i) the ordered sequence of linguistic tokens, (ii) an ordered sub-sequence of the ordered sequence of linguistic tokens, and (iii) a selected token of the ordered sequence of linguistic tokens, responsive to a successful matching, wherein said bidirectional rewriting rules integrate a token pattern recognition rule with at least one character pattern recognition rule.

13. The linguistic processing method as set forth in claim 12, wherein the categorizing comprises:

associating a part of speech with at least one token defining the ambiguous portion of the ordered sequence of linguistic tokens.

14. The linguistic processing method as set forth in claim 12, wherein the categorizing comprises:

associating the ordered sequence of linguistic tokens with a higher level constituent category.

15. The linguistic processing method as set forth in claim 12, wherein the attempted matching of the ordered sequence of linguistic tokens with a syntactical pattern implements one of (i) a context-free grammar rule and (ii) an augmented context-free grammar 16. A parser for parsing a linguistic input, the parser comprising:

a lexicon; and a tokenizing module in operative communication with the lexicon, the tokenizing module dividing the linguistic input into an ordered sequence of linguistic tokens, comprising one or more bi-dimensional rewriting rules implemented in an automaton in which a state is a combination of a category name and a category feature structure, said bi-dimensional rewriting rule further compromising:

a character pattern recognition component for attempting matching of an ordered sequence of characters with a character pattern wherein the character pattern recognition component comprises an automaton operating on a character level;

a token pattern recognition component, comprising an automaton operating on syntactic categories at a token or higher constituent level, for attempting matching of the ordered sequence of linguistic tokens with a syntactical pattern, the token pattern recognition component being integrated with the character pattern recognition component to attempt matching of an ambiguous portion of the ordered sequence of linguistic tokens with an indeterminate portion of the syntactical pattern; and a category associator for associating a constituent category with at least one of: (i) the ordered sequence of linguistic tokens, (ii) an ordered sub-sequence of the ordered sequence of linguistic tokens, and (iii) a selected token of the ordered sequence of linguistic tokens, the associating being performed responsive to a successful matching performed by the token pattern recognition component. rule.

17. The parser as set forth in claim 16, wherein the tokenizing module further attempts assigning a part of speech to each token of the ordered sequence of linguistic tokens without considering surrounding context of the token, and the syntactical pattern specifies one or more part of speech constituents.

18. The parser as set forth in claim 17, wherein the category associator associates a part of speech to at least one token of the ordered sequence of linguistic tokens responsive to a successful matching by the token pattern recognition component.

19. The parser as set forth in claim 16, wherein the automaton implements one of a lemma and a surface form.

* * * * *